Patented Jan. 26, 1954

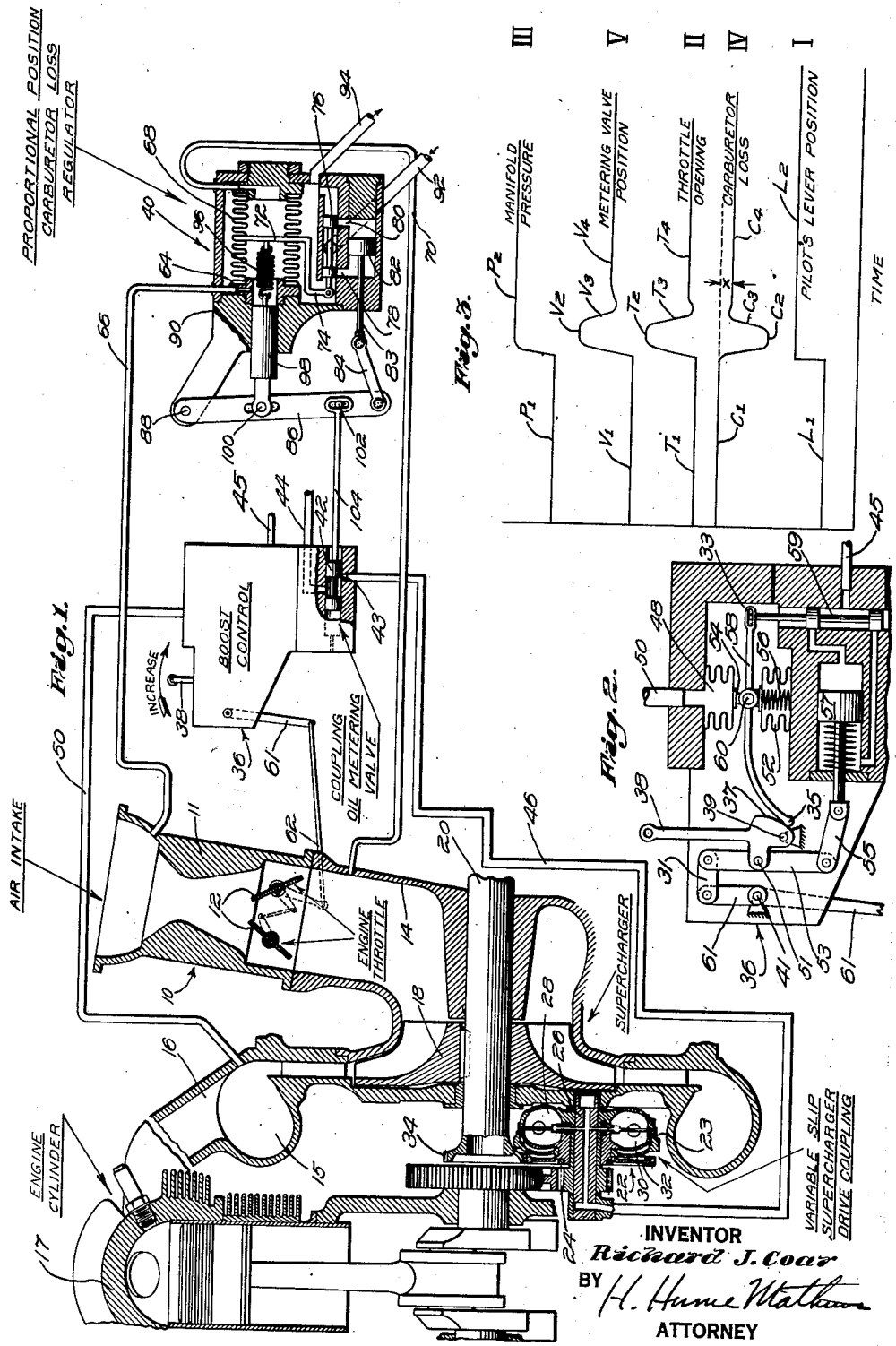

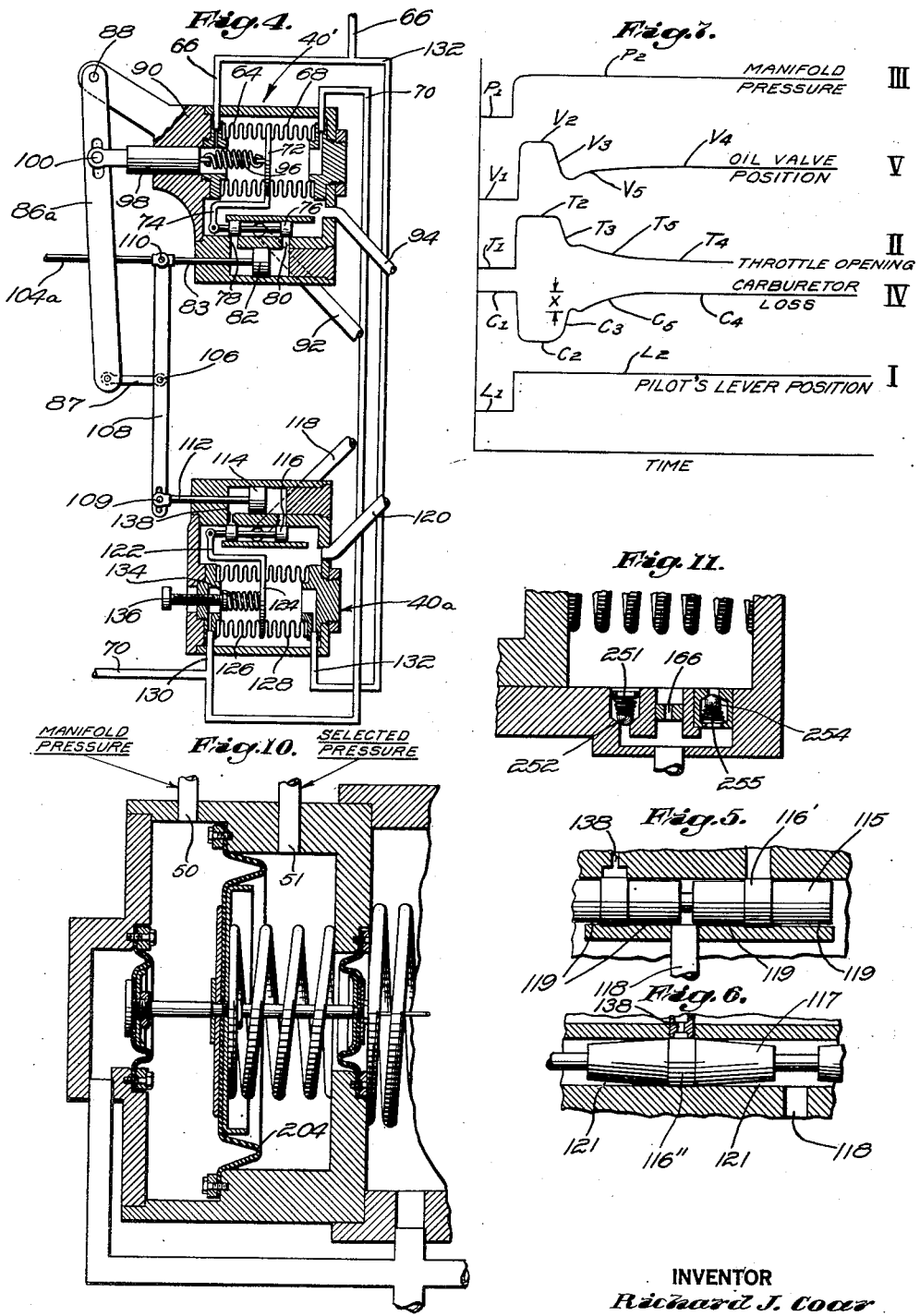

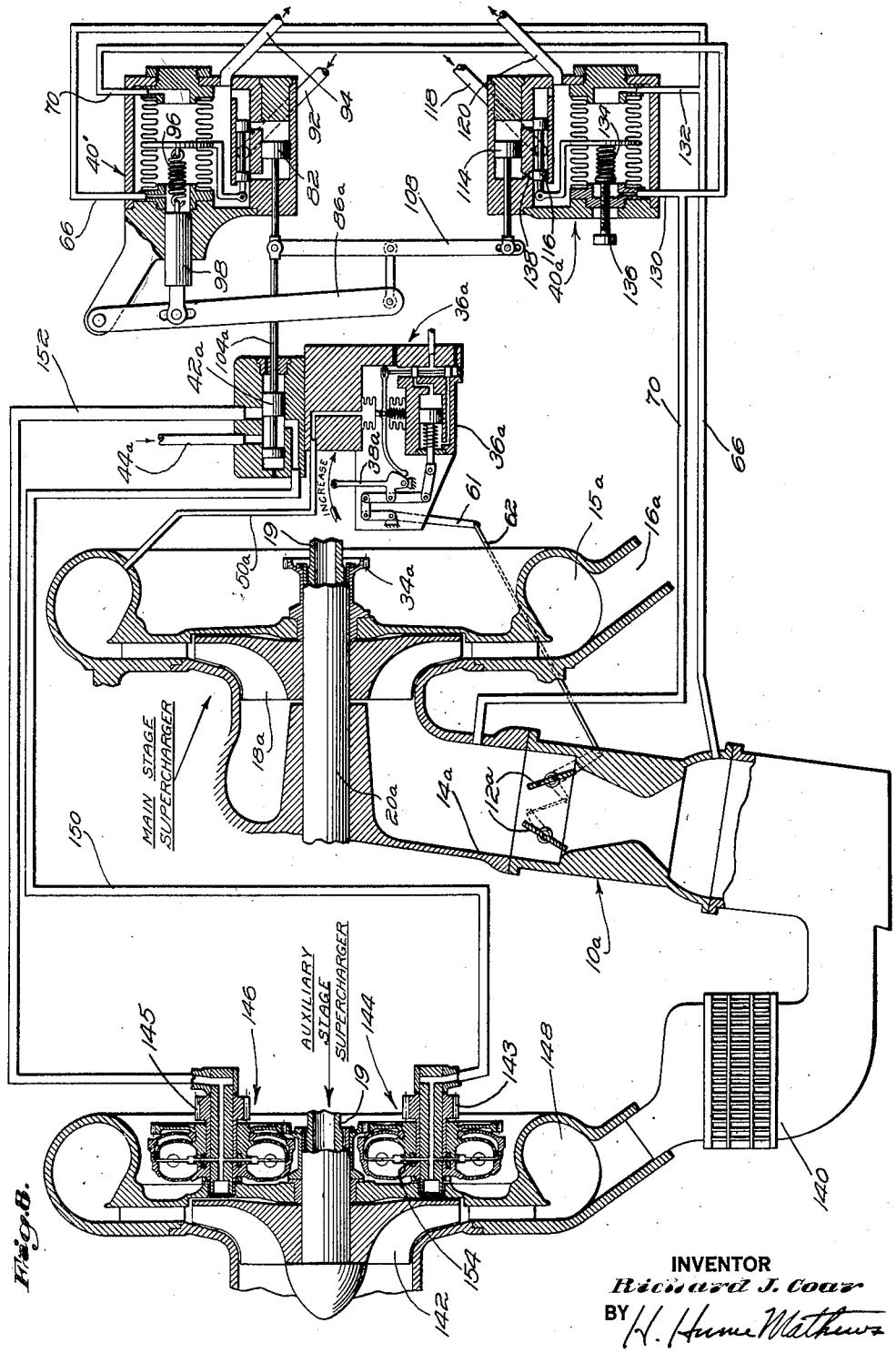

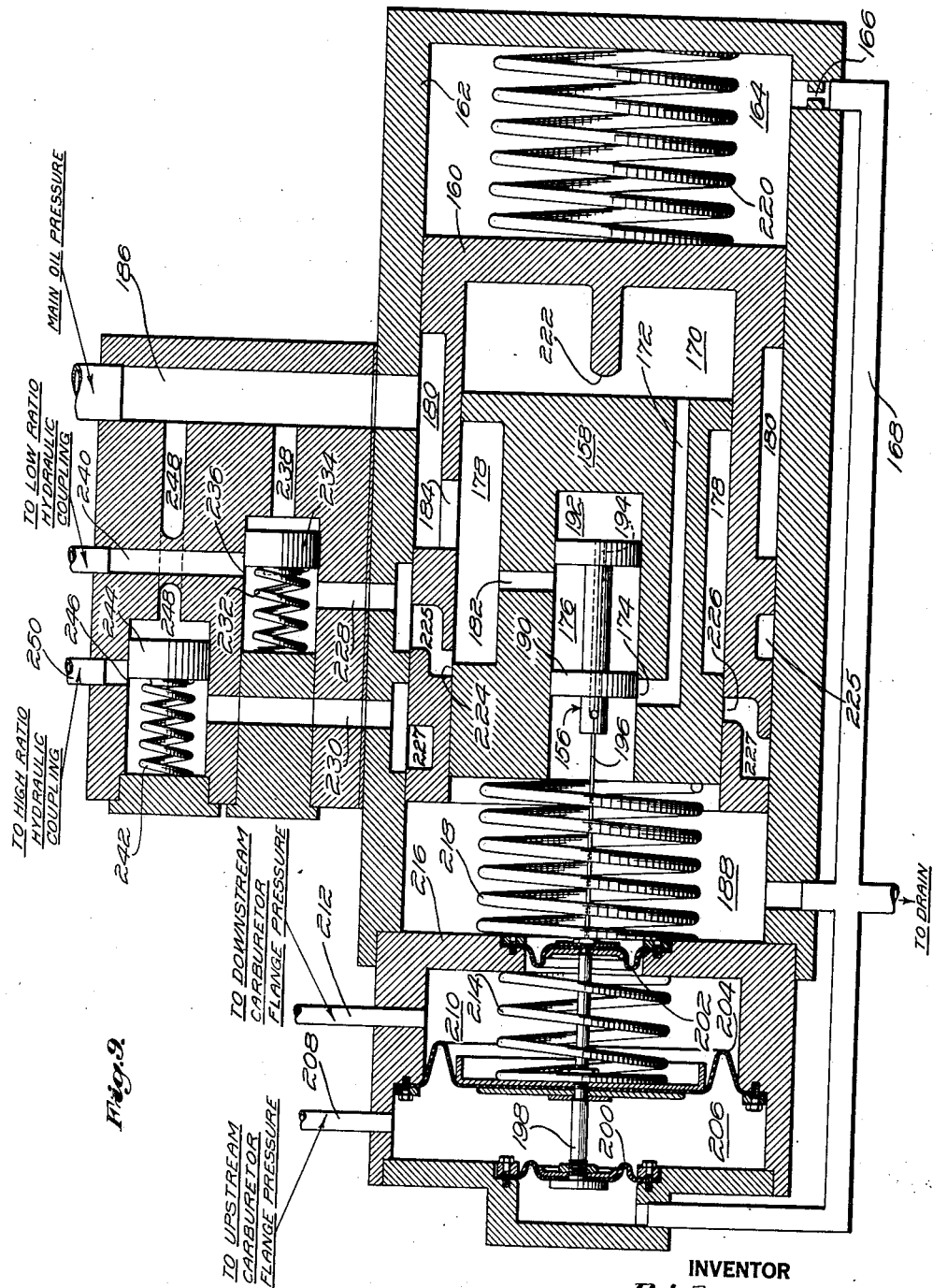

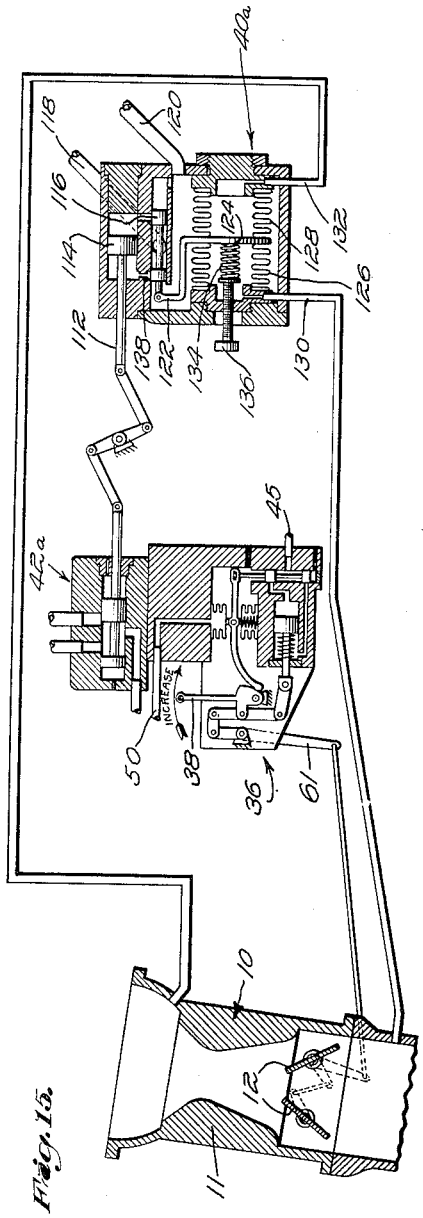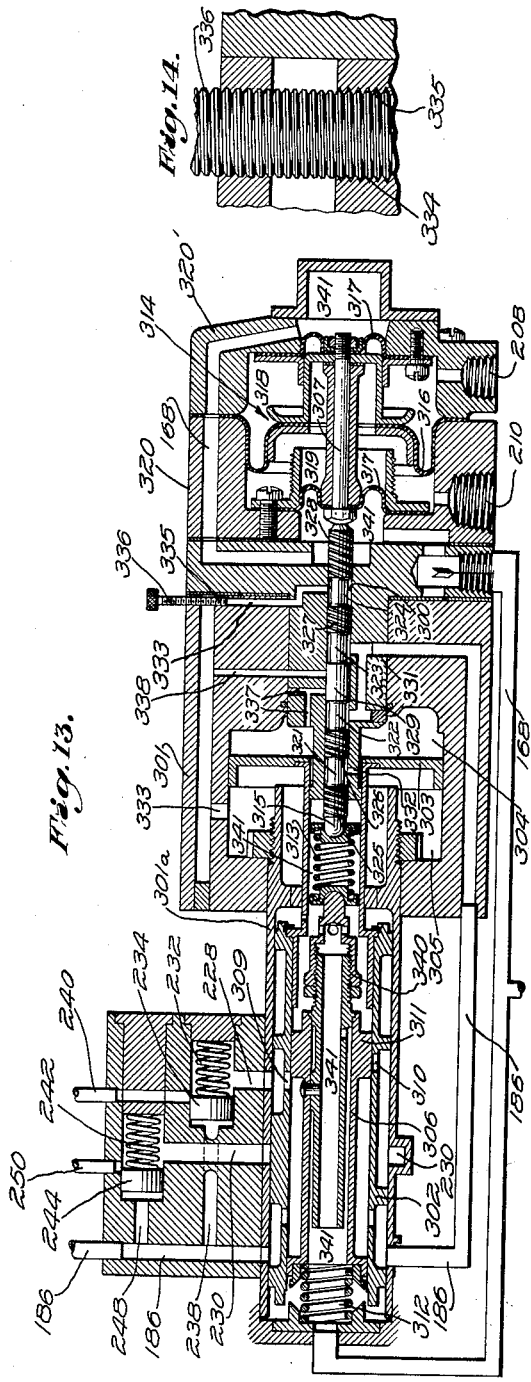

2,667,150

UNITED STATES PATENT OFFICE 2,667,150

CONTROL METHOD AND APPARATUS

Richard J. Coar, Hartford, Conn., assignor to United Aircraft Corporation, East Hartford, Conn., a corporation of Delaware Application May 21, 1947, Serial No. 749,430

24 Claims. (Cl. 123—119)

This invention relates to a control method and apparatus, particularly for hydraulically driven variable speed aircraft engine supercharging blowers.

A principal object of the invention is to provide an improved system for the manifold pressure regulation of a supercharged engine.

Another object of the invention is to provide a stable system for regulating the manifold pressure of an aircraft engine in which the pilot obtains improved "feel," i. e. a system in which any change in the pilot's selection of manifold pressure is followed quickly by a corresponding change in manifold pressure.

Another object is to provide means for regulating the outlet pressure of a hydraulically driven variable speed blower by the simultaneous and coordinated regulation of blower inlet pressure and blower speed.

Another object of the invention is to provide an improved manifold pressure control for an engine having main and auxiliary stage superchargers in which the auxiliary stage supercharger is governed by means responsive to a signal that is not amplified or otherwise affected by the main-stage supercharger.

Another object is to provide an improved engine control device, adapted to be actuated either by the engine manifold pressure or by the pressure drop across the engine throttle, for regulating the speed of an engine driven supercharger.

Another object is to provide a method and apparatus for varying the speed of an aircraft engine supercharger impeller in accordance with changes in the pressure drop across a flow restriction located in either the inlet or the outlet passage of the impeller.

Another object is to provide means for maintaining a pressure drop across the throttle of an internal combustion engine which pressure drop is predetermined, and may be held constant, at varying engine manifold pressures.

Another object of the invention is to provide a control for an engine supercharger drive in which the pressure drop across the engine throttle is used to control the flow of fluid to fluid couplings in the supercharger drive.

Another object is to provide a proportional position control means for regulating the pressure drop across an engine throttle by controlling the oil flow to an engine supercharger drive coupling, in which the change in position of the oil flow control element is proportional to the deviation of the regulated pressure from the selected value.

Another object is to provide a proportional speed control means for regulating the pressure drop across an engine throttle by controlling the oil flow to an engine supercharger drive coupling, in which the time rate of change of position of the oil flow control element is proportional to the deviation of the regulated pressure from the selected value.

Another object is to provide a combined proportional speed and proportional position control means adapted to regulate either the pressure drop across an engine throttle or the engine manifold pressure by controlling the oil flow to an engine supercharger drive coupling, in which the instantaneous change in position of the oil flow control element is proportional to the deviation of the regulated pressure from the selected value and in which the time rate of change of position of the oil flow control element is proportional to the deviation of the regulated pressure from the selected value.

A further object is to provide improvements in the structure and operation of fluid pressure responsive flow control devices.

Other objects and advantages will be apparent from the specification and claims, and from the accompanying drawings which illustrate what are now considered to be certain preferred embodiments of the invention.

In the drawings, Fig. 1 is a diagrammatic view, partly in section, of a supercharger control system constructed in accordance with the teaching of the invention.

Fig. 2 is an enlarged detail view, with part of the casing broken away, of the boost control shown in Fig. 1.

Fig. 3 is a chart illustrating the response of the control system of Fig. 1.

Fig. 4 shows a modified form of the regulator mechanism of Fig. 1.

Figs. 5 and 6 are schematic enlarged views of modified forms of a pilot valve for the regulator 40a in Fig. 4.

Fig. 7 is a chart illustrating the response of a control system like that shown in Fig. 1 when provided with the regulator of Fig. 4.

Fig. 8 is a diagrammatic view, partly in section, showing the regulator of Fig. 4 as used in a control system for a two-stage engine supercharger installation.

Fig. 9 is an enlarged sectional view of a modified regulator suitable for use with either single-stage or multi-stage engines, providing the performance of the regulator of Fig. 4 without the use of inter-connecting linkages and eliminating one of the pilot valves of the Fig. 4 system.

Fig. 10 is a partial sectional view showing how the regulator of Fig. 9 may be actuated by variations in engine manifold pressure relative to a selected reference pressure.

Figs. 11 and 12 are sectional details showing two modifications of the regulator of Fig. 9 for improving the response of the control during periods of acceleration or deceleration and when first reducing altitude below critical.

Fig. 13 is a sectional view of a different form of the regulator shown in Fig. 9.

Fig. 14 is an enlarged detail view of a portion of the Fig. 13 structure.

Fig. 15 is a view showing schematically how the proportional speed regulator 40a in Fig. 4 may be used alone to regulate throttle pressure drop.

Figure 16:
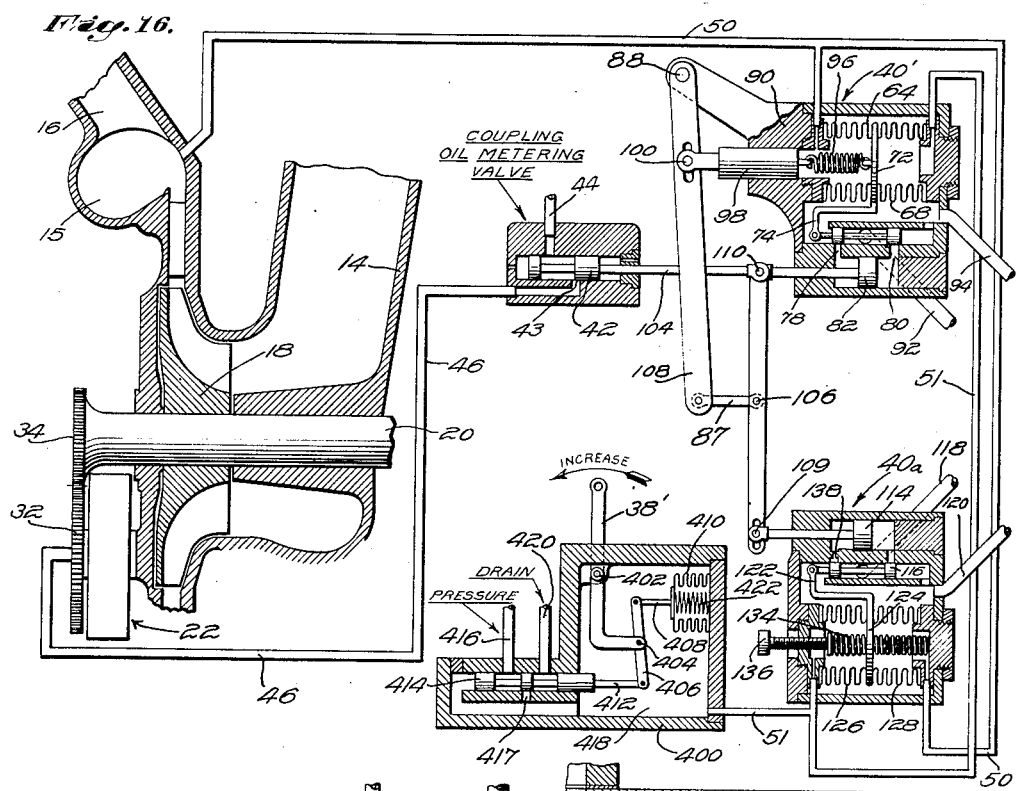
Fig. 16 is a view showing schematically how the regulators 40, 40a shown in Fig. 4 may be used, in combination, for directly controlling engine manifold pressure rather than throttle pressure drop.

One of the conventional types of control for regulating the manifold pressure of an engine having a supercharger driven at a variable speed by fluid couplings is the sequential control in which the throttle is opened fully before the fluid couplings are brought in, or engaged. In such sequential systems the damping required to stabilize the control of the couplings hinders the response in transferring to part-throttle operation because the throttle cannot begin to close until minimum supercharging is obtained. Further, when operating in the variable supercharger speed range (full-throttle) the response of the couplings is inherently slow, and small variations in manifold pressure cannot be corrected by the supercharger speed control.

The present invention, in what is now considered its most important aspect, includes a control means which may be used to obviate the above enumerated and other defects of the sequential type of system by enabling throttle positions and supercharger speed to be simultaneously, regulated, in a co-ordinated manner. The throttle may be maintained in working (or partially closed) position at all times when the aircraft is below critical altitude for high blower, enabling small changes in manifold pressure to be corrected by the boost control, making the throttle always ready to respond instantly to a change in demand, and eliminating any hinderance to quick response by supercharger control damping.

From another aspect, the invention includes a control means which may be used for improving the operation, and particularly the stability, of the sequential type, as well as of other types, of control system.

Referring to the embodiment of the invention illustrated in Fig. 1 of the drawings, 10 indicates generally a carburetor having a venturi 11 and throttle valves 12 in an induction passage 14 leading to the individual cylinder intake pipes 16 of an internal combustion engine (partially shown at 17), for example an engine of the type disclosed in Hobbs-Willgoos application, Serial No. 552,372, filed September 1, 1944. A main stage supercharger impeller 18 in the induction passage 14 downstream from the throttle is mounted on a drive shaft 20 which is driven from the engine by a variable slip fluid coupling, indicated generally at 22. The driving element 28 of the coupling is connected to an engine driven gear 24 on the lay shaft 26. The driven coupling element, or runner, 30 is connected to a gear 32 which meshes with a gear 34 on the super-charger drive shaft 20. Thus, speed of the impeller 18 relative to engine speed is determined by the slip of the coupling, which depends upon the amount of oil supplied to the coupling.

Engine manifold pressure, or the pressure of the intake air in collector ring 15 and intake pipes 16, is controlled by a boost control mechanism generally indicated at 36 which is responsive to manifold pressure and which includes a manually operable lever 38 by which the pilot selects the value of manifold pressure desired. Supercharger impeller speed is separately, and simultaneously, controlled by a regulator generally indicated at 40 which is responsive to carburetor loss, i. e. the pressure drop across the throttle valves 12, and which controls an oil metering valve 42 that meters the flow of oil to the coupling 22.

Boost control 36 includes an expansible bellows 48 (Fig. 2) which communicates with the engine manifold 15, 16 by means of a conduit 50, and a bellows 52 connected with bellows 48 by a link 54, the bellows 52 being evacuated and containing a spring 56 constantly urging the bellows 52 into an expanded position. A manually operable pilot's lever 38, pivoted at 39 on a stationary fulcrum, has a cam surface 37 bearing against one end 35 of a lever 58 which is fulcrumed at 60 on the connecting link 54 and is connected through the pin and slot 33 to a pilot valve 59 which controls the flow of oil under pressure from conduit 45 to opposite sides of servo-piston 57 and the drain therefrom. A link 55 connects the servo-piston rod with one end of a lever 53 pivoted at 51 on a projection of the pilot's lever. Another link 31 connects the upper end of lever 53 with the upper end of an arm 61 fulcrumed on a stationary pivot 41. This arm is connected with and actuates throttle valves 12 through link 62. The arrangement is such that, for any given setting of the pilot's lever, an increase in manifold pressure above the selected value causes the pilot valve 39 to move down, porting oil to the left side of piston 57 and moving it to the right so as to cause the throttle valves to close until the manifold pressure drops to the selected value. The action is similar, but opposite, upon a decrease in pressure below the selected value. Adjustment of lever 38 changes the selected value.

Regulator 40 includes a bellows 64 which is vented through a conduit 66 to upstream carburetor flange pressure and a bellows 68 axially aligned with bellows 64 which is vented through a conduit 70 to downstream carburetor flange pressure. A centerplate 72 forms a wall between bellows 64 and bellows 68, so that the centerplate is responsive to the pressure difference between conduit 66 and conduit 70, or the pressure drop across the carburetor, referred to herein as carburetor loss. This pressure difference is substantially the same as that directly across the throttle valves 12 and is used merely as a convenient source for measuring the pressure drop across the throttle. If desired, conduits 66 and 70 may be connected directly across the throttle, rather than across the entire carburetor 10 as shown.

Centerplate 72 is operatively connected by means of an arm 74 with a pilot valve 76. This valve comprises two axially spaced lands, which in the intermediate, or null, position of the valve, block off passages 78 and 80 leading to opposite sides of a servo-piston 82 having a piston rod 83 connected by an intermediate link 84 to a connecting lever 86 pivoted at 88 on an extension of the regulator housing 90. The valve is supplied with oil under pressure entering into the space between its lands through a conduit 92, and is drained through a conduit 94. Centerplate 72 is constantly urged in a direction to contract bellows 64 by a tension spring 96 which is connected to the plate axially of the bellows at one end and is connected at its other end to a plunger 98 slidable in a wall of casing 90 and connected by a pin and slot connection 100 with the connecting lever 86 intermediate the ends of the latter. The connecting lever also has an intermediate pin and slot connection 102 with a valve rod 104 of the metering valve 42.

It will be evident that when carburetor loss balances the force setting of spring 96 the regulator 40 is static. If the pilot selects a higher manifold pressure, by moving pilot's lever 38 in the direction of the arrow, the throttle valves 12 will be opened by the boost control to correspond to the new position of the lever 38, and, as a result, the pressure in manifold 16 will immediately increase to the selected higher value. However, opening of the throttle also increases the down stream carburetor flange pressure in the conduit 70 and bellows 68, causing plate 72 and pilot valve 76 to move to the left in Fig. 1, porting pressure oil from source 92 to the lefthand end of servo-piston 82 and moving it to the right. This movement of piston 82 to the right results in the movement of metering valve 42 to the right and opens port 43 leading into conduit 46, thereby increasing the flow from constant pressure source 44 to fluid coupling 22. The working chamber of the coupling is continuously drained, in a known manner, through a restricted bleed or drain port 23. Thus the quantity of oil in the coupling working chamber, or the "filling" of the coupling, changes with variations in the rate of flow of oil to the coupling through the conduit 46. When this rate of flow is increased by an opening movement of the metering valve the resultant increase in the quantity of oil in the coupling working chamber decreases coupling slip so that supercharger 18 speeds up and tends to increase the rate of flow of air to the engine and to increase the manifold pressure in the intake pipes 16.

The action of boost control mechanism 36, however, is such as to prevent any change in manifold pressure, either above or below the selected pressure determined by the position of handle 38. Any increase in the manifold pressure within collector ring 15 and pipes 16 is communicated through conduit 50 to bellows 48 and moves the throttle valves 12 in a closing direction, until the manifold pressure returns to the selected value. Consequently, as the supercharger is speeded up in response to a decrease in the pressure differential across the throttle the resultant increase in manifold pressure due to increased supercharger speed acts on the boost control 36 through conduit 50 and causes the throttle valves to move toward closed position, tending to restore carburetor loss towards its original value. The carburetor loss is not quite restored to the original value because of the follow-up action afforded by connecting lever 86 between metering valve 42 and spring 96. This will be evident when it is noted that the tension of spring 96, or the force exerted by the spring on wall 72, is reduced as the metering valve 42 moves to the right and opens port 43, thus requiring less carburetor loss to bring the pilot valve 82 to the null, or balance, position.

The chart shown in Fig. 3 graphically illustrates the response of this control system, as shown in Figs. 1 and 2, to a suddenly imposed change in manifold pressure selected by the pilot. As shown on the chart, a manual shift in the setting of lever 38 in a manifold pressure increasing direction is indicated by the change from $L_1$ to $L_2$ on graph I. This manual operation immediately causes the throttle to open, from position $T_1$ to position $T_2$ in graph II. As a result the manifold pressure instantly increases from $P_1$ to $P_2$ as shown in graph III. Opening of the throttle also causes an immediate decrease in carburetor loss from $C_1$ to $C_2$ in graph IV, thereby causing the metering valve 42 to open as shown by the change from $V_1$ to $V_2$ in graph V. Though the oil flow to coupling 22 immediately increases to a relatively high value, some time is required to fill the coupling and to increase the supercharger speed, which time interval is indicated schematically by the relatively flat tops on the graphs at $T_2$, $V_2$ and $C_2$. As the supercharger speed increases it tends to increase the manifold pressure. However, because of the large inertia of the rotating impeller, this action is slow relative to the operation of the throttle so that the boost control is able to maintain a substantially constant manifold pressure $P_2$ by closing the throttle (as indicated at $T_3$) as the supercharger speed is increased. But the closing of the throttle tends to restore carburetor loss to its original value (see the rise $C_3$ in graph IV) thereby causing the metering valve to close as shown by the drop $V_3$ in graph V. The system finally becomes stabilized at a higher supercharger speed and, therefore, a new metering valve position, as shown at $V_4$, of increased opening. Because the metering valve assumes a more open position ($V_4$) in which the tension of spring 96 is decreased, the carburetor loss at the new manifold pressure setting will be less as is shown by the offset "X" between the lines $C_1$ and $C_4$ in graph IV; the throttle will also be opened wider as shown by the difference between $T_1$ and $T_4$ in graph II. Therefore, in an installation which operates as shown in Fig. 3, the increase from $P_1$ to $P_2$ in manifold pressure is initially derived entirely from the opening of the throttle, but it is finally derived mainly from an increase in supercharger speed and only to a small extent from a more open throttle position.

The operation of this system (as shown in Figs. 1, 2 and 3) provides what may be termed proportional-position action, in that the position of the oil metering valve 42 is a linear function of the carburetor loss, the sense being increased oilflow through the valve 42 in response to decreased carburetor loss. The proportionality (merely a method of limiting the "gain" of the control) is the means used to obtain stability in the control system. A disadvantage of this particular system is that at minimum supercharger speeds an appreciable loss is taken across the throttles, resulting in inefficient use of the supercharger under some operating conditions.

In Fig. 4, a modified regulator mechanism has been shown which may be used with the control system of Fig. 1 and provides stability in the system and for relatively efficient use of the supercharger under all operating conditions. This modification includes a primary regulator unit 40' which is the same as the proportional position regulator of Fig. 1, except that the connecting lever or follow-up lever 86a instead of being directly connected to the valve rod 104a and servo-motor piston 82 is extended and pivotally connected at its lower end through link 87 to the mid-point 106 of a lever 108. Lever 108 is pivotally connected at its upper end at pivot point 110 with valve rod 104a and piston rod 83 of proportional-position piston 82 which rods, in this modification, are axially aligned. At its lower end, lever 108 is pivotally connected with a rod 112 of a reset piston 114 in an auxiliary regulator unit 40a. The reset piston is controlled by a pilot valve 116 which ports oil admitted through conduit 118 from a substantially constant pressure source (not shown) to one or the other side of piston 114. Oil is drained from the opposite sides of the valve through a conduit 120. A flow restriction, such as shown at 138, is provided in either or both of the pilot valve ports. Valve 116 is operably connected by an arm 122 with a centerplate 124 between a pair of aligned bellows 126 and 128 subjected respectively to downstream and upstream carburetor pressure by conduits 130 and 132, which are connected respectively to conduits 70 and 66. Bellows 126 contains a compression spring 134, the force of which is adjustable by a screw 136. It will be noted that the regulator unit 40a, except for the provision of restriction 138, is generally similar in construction to the regulator 40 as shown in Fig. 1.

In operation, the action of regulator unit 40' of Fig. 4 is similar to that shown in Fig. 1. Piston 82 and valve rod 104a actuate the coupling metering valve as before, and the motion of the valve rod is transferred to follow-up lever 86a by lever 108. During a transient, such as a change in selected manifold pressure (a change in the setting of pilot's lever 38), piston 114 and pivot point 106 are essentially static (held substantially stationary) because of the restriction 138 in the oil passage leading to the left-hand side of piston 114. This result can also be accomplished by suitable variation in the configuration of the valve 116. In either case the initial response of the system is a displacement of valve rod 104a (and consequently of metering valve 42) by regulator unit 40' proportional to the change in carburetor loss as in the system of Fig. 1.

The action of regulator unit 40', considered alone, is such that stabilization after a transient is achieved only with an offset such as is indicated at "X" in Fig. 3. In the case of a throttle closing transient, the offset is an increase in carburetor loss; in a throttle opening transient, the offset is a decrease in carburetor loss. But the pilot valve 116 of regulator unit 40a is held in the null, or balance, position only when the carburetor loss balances the force of spring 134. Consequently the offset "X" resulting from an action of unit 40', whether it be in the increased or the decreased direction, is sensed by the reset unit 40a, and centerplate 124 moves or holds pilot valve 116 away from the null position whenever carburetor loss is at a value different from that selected by the setting of spring 134 in the reset regulator unit. For a throttle closing transient, valve 116 is moved to the left in Fig. 4 porting oil to the left side of piston 114. The resultant motion of piston 114 to the right is transferred through levers 108 and 86a, and reduces the loading of spring 96 in the regulator unit 40', which results in action of piston 82 to move rod 104a to the left to reduce oilflow through conduit 46 (see Fig. 1) to the coupling and hence reduce supercharging. Also carburetor loss is reduced. For a throttle opening transient the actions are reversed. Piston 114 becomes static only when the carburetor loss satisfies the setting of spring 134, so that regulator unit 40' is always brought back to the desired setting by the reset unit 40a. The pilot valve 116 is preferably so designed and constructed that the rate-of-change of the position of reset piston 114 is roughly proportional to the deviation in carburetor loss from the value selected by spring 134, i. e. the change in position of piston 114 is approximately the integral of the deviation. For instance, the valve 116 may be constructed as shown at 116' and 116" in Figs. 5 and 6, in which the respective valve lands are provided with cylindrical and conical extensions 115, 117 forming restricted passages 119, 121 that vary the flow restriction of the inlet passages to piston 114 in accordance with the displacement of the pilot valve. The action of reset regulator 40a may be made sufficiently slow in this manner that no instability results. If the pilot valve is formed either as shown at 116' in Fig. 5 or at 116" in Fig. 6 the restriction 138 may be either omitted or retained, as desired. The operation of this system (Fig. 4) provides what can be termed proportional plus floating control.

The response of a control system like that of Fig. 1, but utilizing the regulator modification of Fig. 4, is graphically illustrated in Fig. 7. As shown by this chart, the operation of the throttle and metering valve and the change in manifold pressure and carburetor loss in initially about the same as in the chart of Fig. 3. However, in Fig. 7 the final response is different in that the offset "X" is sensed by the regulator unit 40a, which after a time delay determined by restriction 138 [and/or restrictions 119 (Fig. 5) or restrictions 121 (Fig. 6)] operates to adjust the position of lever 86a and the tension of spring 96 in regulator unit 40' until carburetor loss is returned to its original value. In installations utilizing either the restriction 119 of Fig. 5 or the restrictions 121 of Fig. 6 the final adjustment may be made by a movement of the reset piston 114 at a speed determined by the amount of the offset, providing a gradual final response as shown at $V_5$, $T_5$ and $C_5$ in Fig. 7.

In Fig. 8 the controls of Fig. 4 are applied to a two-stage supercharged engine including the main stage supercharger 18a discharging into the collector ring 15a and the engine induction pipes 16a and which may be driven by the engine through a gear train and/or fluid couplings (not shown) connecting the engine crankshaft with the gear 34a on the drive shaft 20a of the supercharger. Air is supplied to the supercharger 18a through the intercooler 140 and the carburetor 10a (including a throttle 12a) in the induction passage 14a by an auxiliary stage supercharger 142 driven by the engine through a gear train (not shown) which connects the drive gears 143, 145 for the low speed ratio and high speed ratio couplings 144 and 146 with a drive shaft 19 that is connected to the engine crankshaft. Boost control 36a (which is the same as the control 36 in Fig. 1) is vented to manifold pressure in collector 15a through conduit 50a. The oil metering valve 42a controls the flow of coupling working fluid from a substantially constant pressure source 44a through the conduit 150 to the low speed ratio coupling 144 and through conduit 152 to the high speed ratio coupling 146. It will be evident that as valve 42a moves to the right in Fig. 8 pressure oil is first metered to the low ratio fluid coupling 144 through conduit 150 and then (after the inlet port to conduit 150 is fully opened) is metered to the high ratio fluid coupling through conduit 152. The bellows of regulator units 40' and 40a are connected to the upstream and downstream carburetor pressures as in Fig. 4.

In the operation of the modification shown in Fig. 8, air from the free airstream enters the auxiliary stage supercharger 142 in which it is compressed and delivered to collector ring 148 from which it is delivered through intercooler 140 and carburetor 10a to the main stage supercharger 18a. After compression by supercharger 18a, the air is delivered by way of collector ring 15a and intake pipes 16a to the engine cylinders. The carburetor throttle valves 12a are operated by boost control 36a so as to regulate manifold pressure in the intake pipes 16a (in the manner described more fully in connection with Fig. 1) to the value selected by manually operable pilot's lever 38a. Valve 42a is actuated through valve rod 104a by the regulator units 40' and 40a, these units being vented to upstream and downstream carburetor flange pressures by conduits 69 and 70 respectively. The carburetor loss, or the value of the pressure loss maintained across the throttle valves, is determined (in the manner described in connection with Fig. 4) by the adjustment screw 136 for the spring 134 in the reset unit 40a. When the carburetor loss remains greater than this setting the metering valve 42a is closed and supercharger 142 idles. If the carburetor loss becomes less than the value selected by adjustment of spring 134, i. e. as the supercharger 142 demand increases, oil is metered first to low ratio fluid coupling 144 and then to high ratio coupling 146 until the auxiliary impeller speed is increased to a point sufficient to bring the pressure drop across the carburetor back to the selected value. Whenever the high ratio coupling 146 carries the supercharger load, ring valve 154 within the low ratio coupling 144 shuts off the flow of oil into this coupling so that coupling 144 does not constitute a drag under these conditions. For a more complete description of the operation of the fluid couplings and the ring valve 154 reference is made to Hobbs-Willgoos Patent No. 2,400,307, issued May 14, 1946.

In the arrangement of Fig. 8, since the throttling occurs downstream from supercharger 142, the power loss is negligible if the carburetor loss is held fairly low, for example two to three inches of mercury for some installations.

The modification shown in Fig. 9 accomplishes the performance of the control system shown in Fig. 4 without interconnecting linkages and with a single pilot valve. In this construction a pilot valve 156 is slidable within a metering valve 158. Metering valve 158 is slidable within a cylindrical liner 160 which in turn is slidable within a stationary housing 162. It will be noted that pilot valve 156, metering valve 158, liner 160 and housing 162 are all concentric. Housing 162 and liner 160 form a chamber 164 which is connected through a restriction, or bleed, 166 to a drain conduit 168 which discharges into a sump (not shown). This sump is located above the level of the control so that conduit 168 is maintained full of oil. Chamber 170 formed between metering valve 158 and liner 160 is connected by a passage 172 to port 174 which is alternately connected either to a source 186 of oil under substantially constant pressure through annular spaces 176, 178, 180 and passages 182, 184 or to drain in chamber 188, depending on the disposition of pilot valve land 190 with respect to port 174. Chamber 192 between the pilot valve and the metering valve is connected by an axial passage 194 through the pilot valve to drain chamber 188. Pilot valve 156 is operated by a rod 196 connected to a diaphragm stem 198 to which are fixed two balancing diaphragms 200 and 202 and the carburetor loss diaphragm 204. Chamber 206 on the left side of diaphragm 204 is vented to the upstream carburetor flange pressure by conduit 208 (which may be connected to conduit 66 in Figs. 1 and 8) and chamber 210 on the right side of the diaphragm is vented to downstream carburetor flange pressure (conduit 70 in Figs. 1 and 8) by conduit 212. Diaphragm 204 and stem 198 are urged to the left in Fig. 9 by a spring 214 acting against a wall 216 in the diaphragm housing; valve 158 is urged to the right by relatively stiff spring 218 acting against the opposite side of the housing wall 216 and valve liner 160 is urged to the left by a relatively soft spring 220 acting against the right hand end wall of the housing 162.

Springs 218 and 220 tend to hold metering valve 158 against a stop 222 in liner 160. The valve and liner are so designed that in such a position (with valve 158 in abutment with stop 222) ports 224 and 226 leading respectively to the annular chambers 225, 227 are both closed by the left-hand land on the metering valve. As valve 158 moves to the left in Fig. 9, relative to the valve liner 160, port 224 is first opened, metering oil from source 186 by way of chamber 178 into chamber 225 and passage 228; then port 226 is opened metering oil from the passage 178 into chamber 227 and passage 230.

The pressure of oil in passage 228 acts with spring 232 to move piston valve 234 to the right to open port 236 leading to the low ratio hydraulic coupling 144 through passage 240 (which may be connected to conduit 150 in Fig. 8). This motion of valve 234 is resisted by the main oil pressure in source 186, to which the valve piston is subjected by a passage 238, so that a constant pressure difference is provided across port 224. Pressure of the oil in passage 230 acts with spring 242 to move piston valve 244 to the right to open port 246 leading to the high ratio hydraulic coupling 146 through passage 250 (which may be connected to conduit 152 in Fig. 8). This motion is resisted by main oil pressure in chamber 248 which is connected with the oil inlet 186. Valve 244 acts to throttle the oil flow through passage 230 so as to provide a constant pressure drop across port 226.

The above described elements of the construction shown in Fig. 9 cooperate to provide what may be termed proportional-position plus proportional-speed control, in the following manner.

The pilot valve 156 is hydraulically balanced by fluid communication through passage 194 so that the carburetor loss acting on the net area of diaphragm 204 is opposed only by the force of spring 214. Thus the position of diaphragm 204 and consequently the position of pilot valve 156 will bear a linear relationship to the carburetor loss, valve 156 moving to the right in Fig. 9 as the carburetor loss increases. Port 174 cooperates with land 190 so that metering valve 158 follows the pilot valve 156 as the latter moves; i. e. as pilot valve 156 moves to the right, port 174 is opened to drain, thus relieving the pressure in chamber 170 and enabling spring 218 to move valve 158 to the right until land 190 again registers with or closes port 174. If the pilot valve 156 is moved to the left in Fig. 9 land 190 opens port 174 to main oil pressure in passage 186 by way of port 182 and this pressure acting in chamber 170 against valve 158 moves the latter to the left against the force of spring 218 until port 174 again registers with or is closed by land 190. The configuration of port 174 and land 190 is preferably such that the action of the metering valve 158 in following the movements of the pilot valve 156 is nearly instantaneous; that is, a change in position of the metering valve 158 is effected by a change in carburetor loss with minimum lag. It will be apparent that by virtue of spring 218, the pressure in chamber 170 relative to the pressure in drain conduit 168 bears a linear relationship to the position of valve 158. As the metering valve position is maintained in linear relation to the carburetor loss, the pressure in chamber 170 will vary linearly with carburetor loss but in the opposite sense; i. e. as the carburetor loss increases, pressure in chamber 170 decreases.

Liner 160 is urged to the right in Fig. 9 by pressure in chamber 170 and is urged to the left by spring 220. Spring 220 preferably has a low rate, so that in effect it is a constant effort spring and could by modification of the design be replaced by a constant effort hydraulic piston. The load provided by spring 220 is (by proper selection of the spring) made to balance the pressure achieved in chamber 170 when the carburetor loss equals the desired value, i. e. when the desired value of carburetor loss is obtained (and then only) spring 220 balances the pressure in chamber 170 and the liner 160 is static. Whenever the pressure in chamber 170 does not balance the force of spring 220 (carburetor loss being above or below the selected value) then liner 160 is moved relative to metering valve 158 so as to vary the oil flow to the couplings through ports 224, 226 until the carburetor loss, and consequently the pressure in chamber 170, is returned to the selected value. However, this action of liner 160 is delayed in time, relative to movements of the metering valve, by the effect of flow restriction 166. Thus, the compensating or readjusting movements of liner 160 occur only at a relatively slow rate, following a movement of the metering valve, or following a transient.

If the carburetor loss should increase above the selected value metering valve 158 is moved to the right in Fig. 9 relative to liner 160 tending to close ports 226 and 224 (or either of them) in that order and reducing the oil flow to the couplings, thereby reducing the supercharging and the carburetor loss. A reverse action results when carburetor loss falls below the selected value. This action, which is similar to the action of the regulator unit 40' in Fig. 4 is "proportional" in that the change in metering valve position is proportional to the change in carburetor loss. Assuming that liner 160 were fixed, this would result in a different carburetor loss for each metering valve position, as in the system of Fig. 1 and as shown by offset "X" in Fig. 3. However, the increased carburetor loss above the selected value produces pressure in chamber 170 less than that obtained at the desired setting. The force of spring 220 being then greater than the pressure in chamber 170, it urges liner 160 to the left, which closes ports 226 and 224 (or either of them), thereby reducing the carburetor loss until the desired value is achieved. This action of liner 160 is delayed by the restriction 166 (since oil must enter or leave chamber 164 through the restriction whenever liner 160 moves relative to housing 162), so that the liner acts in a manner similar to the regulator unit 40a in Fig. 4 to gradually reset the regulator following a transient.

When a transient is imposed on the engine resulting in a decrease in carburetor loss below the selected value metering valve 158 is moved to the left so as to increase the oil flow to the couplings and the pressure in chamber 170 is increased above the equilibrium value overpowering spring 220 and tending to move liner 160 to the right, thus further opening the ports which regulate the flow of oil to the couplings. However, the motion of liner 160 is restricted, or damped, by the hydraulic restriction 166 since chamber 164 is filled with oil and as liner 160 moves this oil must flow in or out through the restriction 166. The pressure drop across restriction 166 is proportional to the error in carburetor loss (the pressure in chamber 164 is always less than the pressure in chamber 170 by a fixed amount, determined by the force of spring 220, necessary to establish equilibrium of forces acting on liner 160). Therefore, if the restriction 166 is designed (for instance as a long passage of small cross-sectional area) so as to have essentially capillary characteristics (flow rate proportional to pressure drop) the time rate of motion of liner 160 and of the resultant opening or closing of the coupling oil flow regulating ports 224, 226 may be made proportional to the error of the controlled variable. This characteristic is generally termed proportional-speed response.

The amount of opening of ports 224, 226 in Fig. 9 and therefore the rate of flow of oil to the couplings is determined then by the proportional-position action of metering valve 158 and by the proportional-speed action of metering liner 160. As in the case of Fig. 4, stability is provided by the position proportionality, and elimination of any offset is provided by proportional-speed action. The proportional-speed action is made sufficiently slow by restriction 166 so as not to introduce instability into the control system. Performance of the Fig. 9 construction is essentially the same as that shown in the chart of Fig. 7. Obviously, this construction is equally applicable to single-stage engines (see Fig. 1) as to two-stage engines (see Fig. 6).

As shown in Fig. 10, the Fig. 9 construction may be used to control other variables than carburetor loss. For instance, it may be used to provide stable regulation of supercharger output to a constant manifold datum directly. This is accomplished by subjecting diaphragm 204 to manifold pressure in conduit 50 and to a selected reference pressure in conduit 51, respectively. Of course the throttle boost control 36 is then omitted.

Figure 12:
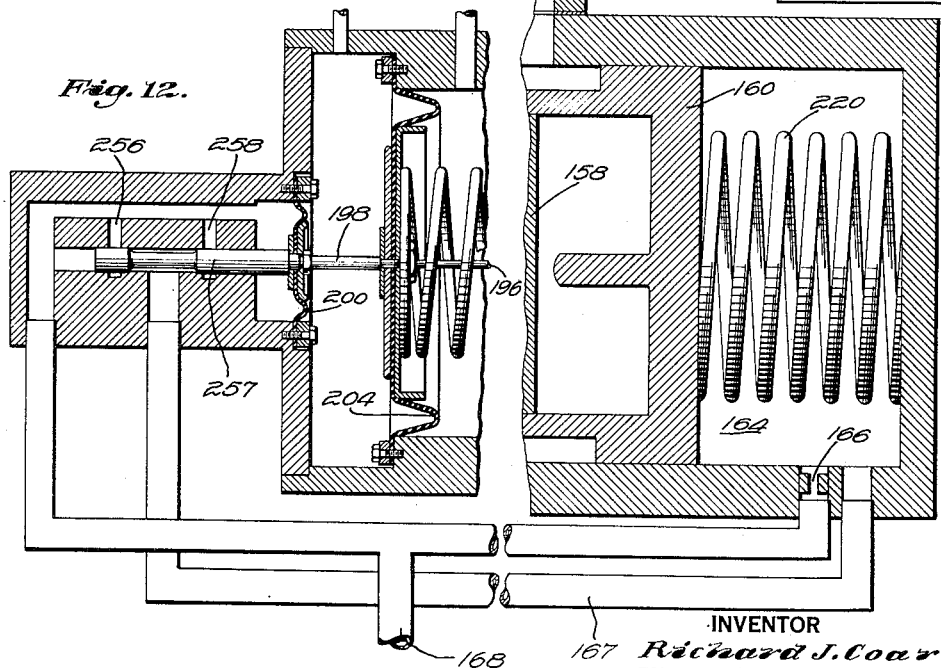

To improve the response of the control during periods of acceleration, and when first reducing the altitude below critical, it may be desired to by-pass bleed 166 in Fig. 9. One such arrangement is shown in Fig. 11. When the error (as indicated by the pressure drop across bleed 166) exceeds an arbitrary amount (which may be predetermined by proper selection of spring 251 and spring 255), check valve 252 or check valve 254 will open automatically and allow unrestricted movement of liner 160 until the error is reduced below this amount. Another automatically acting accelerator arrangement is shown in Fig. 12. When the error (as indicated by the position of pilot valve 156) exceeds a predetermined amount, port 256 or port 258 is opened by movement of accelerator valve 257, allowing oil to flow freely from chamber 164 through by-pass 167 to drain 168 and permitting unrestricted motion of liner 160 until the error is reduced below this amount.

Fig. 13 shows a modification of the Fig. 9 regulator. In the form shown in Fig. 13, the regulator comprises a housing composed of two sections 301 and 301a in which piston 303 and a sleeve valve element 302, fixed thereto respectively reciprocate. Piston 303 cooperates with the housing 301 to form two chambers 304 and 305 on opposite sides of the piston. A valve member 306 reciprocates within sleeve 302 and cooperates therewith to form variable flow regulating orifices for the low speed coupling and the high speed coupling, respectively, by registry of ports 309, 310 in sleeve 302 with land 311 of valve member 306. Member 306, which may be varied in length by adjusting means 340, is urged to the right by spring 312 and to the left by a spring 313 which is resiliently loaded by diaphragm assembly 314 through rod 315. The diaphragm assembly consists of a stem 307, an actuating diaphragm 316, a pair of balancing diaphragms 317, and associated connecting parts. Chambers 318, 319 formed between diaphragm 316 and cap pieces 320, 320' are connected respectively to upper carburetor flange pressure and lower flange pressure (for instance through conduits 66 and 70 in Fig. 1 or Fig. 8). Rod 315 contains annular grooves 321, 322, 323, 324 forming lands 325, 326, 327, 328, 329. These lands fit closely in bore 300 of an adapter 331 located between cap piece 320 and housing 301 and extending partially within the housing. Four of the lands, 325, 326, 327 and 328 have helical flow restricting grooves cut on their periphery. Annular spaces 321 and 324 are connected by passages 332, 333 to chambers 304, 305 respectively. Passage 333 may be provided with a flow restriction, for instance (see Fig. 14) a helical restricted groove 334 formed between tapped hole 335 and a close fitting screw 336 may be interposed between annulus 324 and chamber 305. The smooth surfaced land 329 controls the flow of oil through ports 337, 338 to chambers 304, 305 respectively. The several chambers 341 are connected to drain by the passages 168. Oil under substantially constant pressure is supplied to the regulator by conduits 186. The pressure drops across the coupling oil flow regulating orifices 309, 310 are controlled by valves 234, 244 which are the same as in Fig. 9.

The regulator of Fig. 13 functions as follows. Oil is supplied under pressure by conduit 186 to annuli 322 and 323 from whence it flows through the helical grooves of lands 326 and 327 to annuli 321 and 324 and thence through the helices of lands 325 and 328 to drain 341. The oil undergoes a gradual reduction in pressure as it flows through the restricted grooves. By reciprocating rod 315 in bore 300, the effective length of the grooves in lands 325 and 328 (the length of the passage in which oil is constrained to flow) may be varied. That is, as the rod is moved to the right, the flow path from annulus 321 to drain 341 is lengthened, and the flow path from annulus 324 to drain 341 is shortened, resulting in increased pressure at annulus 321 and decreased pressure at annulus 324. When the rod is moved to the left the converse obtains. The null position of rod 315 is defined as that position at which the pressures in annuli 321 and 324 are equal. The pressure difference between annuli 321 and 324 (for the condition when there is no flow through passages 332 and 333) is very nearly a linear function of the displacement of the rod from the null position, within the design range of operation.

Rod 315 is urged to the right by springs 312 and 313 and is urged to the left by the pressure difference (carburetor loss) between chambers 318, 319 acting on the net area of diaphragm 316. Since the area of piston 303 acted upon by the pressure in chamber 305 is equal (or substantially equal) to the area of the piston acted upon by the pressure in chamber 304, the regulator is static when rod 315 is in the null position because in this position the pressures in annuli 321, 324 and consequently the pressures in chambers 304, 305 connected thereto by passages 332, 333, are equal. The pressure difference (carburetor loss) required across diaphragm 316 to balance the force of springs 312, 313 when rod 315 is in its null position is defined as the "setting" of the regulator and may be varied by adjustment 340. Whenever any deviation from this setting is experienced, rod 315 is displaced from the null position an amount, or a distance, proportional to the deviation, by virtue of the combined rates, or deflection, of springs 312, 313. Valve member 306, however, will be displaced only a fraction of said amount, the fraction being a function of the relative rates of springs 312 and 313.

It has been shown that, when rod 315 is displaced from the null position, a pressure difference is effected between annuli 321, 324 and passages 332 and 333. This pressure difference is applied across piston 303 and will cause it (and the valve sleeve 302 connected thereto) to move, opening or closing orifices 309, 310 successively as required to correct the deviation by varying the rate of oil flow to the couplings. The helical grooves in lands 325, 326, 327 and 328 preferably have capillary characteristics (i. e. flow proportional to pressure drop), and when this is the case piston 303 will attain a velocity approximately proportional to the displacement of rod 315 from its null position. In some installations, if sufficient throttling cannot otherwise be obtained by the helical grooves on the lands of rod 315, it is proposed to apply the pressure difference from annuli 321, 324 across the helical flow restriction 334 between the screw 336 and the threaded bore 335. In other installations the auxiliary helical restriction 334 may be omitted.

From the above description it is seen that the response of the Fig. 13 regulator to a deviation in carburetor loss may be described as proportional-position plus proportional-speed. Valve member 306 is moved directly by diaphragm assembly 314 providing an instantaneous change in oil flow proportional to the deviation, thus providing a proportional position action. To correct the offset (see "X" in Figs. 3 and 7) which would otherwise be obtained upon reestablishment of equilibrium, the piston 303 is moved at a velocity proportional to the deviation by flow through passages 332, 333 created by the pressure difference between annuli 321, 324 whenever rod 315 is away from its null position. Stability is provided by limiting the ratio of the travel of valve member 306 to the deviation, and by providing sufficiently low velocities of piston 303 and liner 302.

When the proportional-position variables are such that the full opening or closing of orifices

309, 310 is not obtained with maximum attained deviations of carburetor loss, the response of the control to transients requiring a large change in coupling oilflow (for an acceleration from engine neutral cruise power to high blower military power for example) is limited by the viscous damping applied to piston 303. This condition is obviated by an accelerating means comprising the land 329 and ports 327, 328. If carburetor loss deviation exceeds a predetermined maximum rod 315 is shifted far enough to move land 329 away from either port 327 or port 328, depending on the direction in which the rod is shifted. The result is to port one or the other of chambers 304, 305 directly to inlet pressure, thus by-passing the viscous damping whenever the deviation exceeds predetermined limits, so that the response to said transients will be immediate.

The Fig. 13 form of regulator provides an improved method of viscous damping, wherein the proportional speed action is obtained independently of the proportional-position response. It also provides an improved method of by-passing the viscous damping to improve response to transients involving large changes in control output, and it provides an improved mechanical construction, wherein large amounts of follow-up action (synonymous with small proportional piston response) can be obtained with lighter springs.

The various regulator combinations and constructions described above are adapted for use in controlling other variables than carburetor loss. For instance, the Fig. 13 construction might be used to regulate engine manifold pressure directly, by applying manifold pressure to one side of diaphragm 316 through conduit 203, the other side of the diaphragm being subjected to a selected variable reference pressure through a conduit 210, as in the case of Fig. 10. The regulator will then be directly responsive to manifold pressure and will function to vary the oil flow to the couplings and control supercharger speed so as to maintain the manifold pressure, or supercharger outlet pressure, in predetermined relationship to the selected reference pressure.

Further, certain sub-combinations, or units, of the regulator constructions previously described may be used per se for control purposes. Thus, Fig. 15 shows schematically how the proportional speed regulator unit 40a of Figs. 4, 5 and 6 can be used alone for regulating the loss across the carburetor 10. In Fig. 15 engine manifold pressure is regulated by the boost control 36 as in the case of Fig. 1. However, carburetor loss is regulated by the proportional speed regulator unit 40a, rather than by the proportional position regulator of Fig. 1.

Fig. 16 shows schematically how the combined proportional-position and proportional-speed regulator of Figs. 4, 5 and 6 may be used to provide stable regulation of supercharger output to a constant manifold pressure datum directly. Instead of being connected across the carburetor, the regulator of Fig. 16 is connected directly to the outlet side of the supercharger and to a source providing a selected variable pressure, so that the regulator is subjected to a manifold pressure signal and to a selected reference pressure in the same manner as in the modification of Fig. 10. In Fig. 16 the regulator units 40' and 40a actuate the metering valve 42 to control the flow of oil to coupling 22 so as to regulate the speed of supercharger 18 exactly as in the case of Fig. 4. But in Fig. 16 the regulator bellows 64 and 128 are vented to manifold pressure through conduit 50 (rather than to upstream carburetor flange pressure), while the bellows 68 and 126 are vented through conduit 51 to a source 400 providing a selected reference pressure (rather than being vented to downstream carburetor flange pressure). Therefore the regulator will control supercharger output so as to maintain the engine manifold pressure in the intake pipes 15 at a constant value relative to the selected pressure in source 400.

The reference pressure source 400 comprises a manually operated pilot's lever 38' movable about a pivot 402 so as to change the position of a fulcrum 404 of a lever 406 interconnecting stem 408 on an evacuated bellows 410 and stem 412 of a balanced valve 414. This valve when moved to the right from its null position admits fluid (such as oil) from a substantially constant pressure source 416 through port 417 into the pressure chamber 418 surrounding the bellows 410. When moved to the left, valve 414 opens port 417 and chamber 418 to drain through conduit 420. Bellows 410 is expanded by spring 422 therein and is contracted by the fluid pressure in chamber 418. These movements of the bellows are transmitted to valve 414 by lever 406 in such manner as to regulate the pressure in chamber 418 to a constant value selected manually by the position of pilot's lever 38' and fulcrum 404. For any given setting of the pilot's lever, an increase in pressure in chamber 418 above the selected value will collapse bellows 410 and move valve 414 to the left, opening port 417 to drain until the chamber pressure is returned to the selected value. If the chamber pressure falls below the selected value bellows 410 is expanded by spring 422 which shifts valve 414 to the right and ports the chamber to inlet pressure in conduit 416, until the chamber pressure is returned to the selected value.

The regulator units 40' and 40a in Fig. 16 function so as to maintain the engine manifold pressure at a substantially constant value relative to the reference pressure in bellows 68 and 126. As this reference pressure may be changed, or selected, by the pilot's lever 38' it will be apparent that engine manifold pressure will, by the units 40', 40a and 400, be regulated to a constant datum that can be selected by the pilot's lever.

The engine throttle has not been shown in Fig. 16. If a throttle is provided in an installation such as shown in Fig. 16 (or Fig. 10) it is preferably operated either manually or automatically, in a known manner, in sequence with the supercharger regulator. In such an arrangement, the supercharger is inactive or idles during part throttle operation and the supercharger regulator operates to control manifold pressure only for operating conditions above full throttle.

Several embodiments of the invention have been shown and described herein, but it will be understood that the invention is not limited to the details of construction, or of the specific combinations and arrangements of elements herein illustrated, but covers all such forms as fall within the scope of the appended claims.

I claim:

1. In an engine having an induction system, a supercharger and a throttle in said induction system, means including a variable slip fluid coupling for driving said supercharger, and means responsive to the pressure on the upstream side of said throttle and the pressure between the throttle and supercharger for controlling the speed of said supercharger by varying the slip of said fluid coupling.

2. In an engine having a supercharger, a variable slip fluid coupling for driving said supercharger at a variable speed relative to said engine, means for varying the speed ratio of said coupling with changes in the position of a control element, proportional-position means for relatively quickly changing the position of said control element by amounts proportional to deviations from a predetermined value of a fluid pressure that is affected by the speed of said supercharger, resetting means for relatively slowly adjusting said control element until said fluid pressure is returned to said predetermined value, a throttle for regulating the engine intake air pressure, and in which said fluid pressure deviations are the variations from a predetermined value of the pressure on one side of said throttle relative to the pressure on the other side thereof.

3. Apparatus according to claim 2, including means associated with said resetting means for causing said control element to be adjusted by said resetting means at a speed proportional to deviations in said fluid pressure from the predetermined value.

4. In combination with a pair of compressors arranged in series in a fluid passage, a movable throttle in said fluid passage for controlling the delivery pressure of the downstream compressor, and means for varying the speed of the upstream compressor to maintain a measured fluid pressure drop across said throttle, the speed of the upstream compressor, or auxiliary supercharger, is controlled in accordance with changes in the outlet pressure thereof relative to the inlet pressure of said downstream compressor, or main stage supercharger, by varying the slip of a fluid coupling.

5. Apparatus for regulating the flow of a fluid comprising, a metering element, means responsive to a fluid pressure for moving said element to positions determined by the deviation of said pressure from a selected value, a metering member associated with said element and cooperating therewith to form at least one flow restriction the capacity of which is varied at a relatively fast rate by movements of said element so as to control said regulated fluid flow, and means for operating said member at a relatively slow rate for further varying the flow capacity of said restriction by changing the relationship between said element and said member.

6. Apparatus according to claim 5 including means for operating said metering member at a speed which varies in accordance with the deviation of said pressure from the selected value and further including means for maintaining a substantially constant pressure drop across said flow restriction.

7. Apparatus according to claim 6 in which the speed of operation of said metering member is determined by a fluid pressure that varies as a function of the position of said metering element and which acts on both said metering element and said metering member.

8. Apparatus according to claim 6 in which the speed of operation of said metering member is determined by a pressure difference created by said deviation.

9. Apparatus according to claim 6 including accelerator means automatically effective only when the deviation of said pressure from the selected value exceeds a predetermined maximum to render said metering member operative at a relatively fast rate so long as said deviation exceeds said maximum value.

10. Apparatus according to claim 5 in which the speed of operation of said metering member is determined by a fluid pressure that varies as a function of the position of said metering element and which acts on both said metering element and said metering member.

11. Apparatus according to claim 10 including accelerator means automatically effective only when the deviation of said pressure from the selected value exceeds a predetermined maximum to render said metering member operative at a relatively fast rate so long as said deviation exceeds said maximum value.

12. Apparatus according to claim 5 in which the speed of operation of said metering member is determined by a pressure difference created by said deviation.

13. Apparatus according to claim 12 including accelerator means automatically effective only when the deviation of said pressure from the selected value exceeds a predetermined maximum to render said metering member operative at a relatively fast rate so long as said deviation exceeds said maximum value.

14. Apparatus according to claim 5 including accelerator means automatically effective only when the deviation of said pressure from the selected value exceeds a predetermined maximum to render said metering member operative at a relatively fast rate so long as said deviation exceeds said maximum value.

15. In an engine having an induction passage, a supercharger and a throttle in said passage, means for varying the output of said supercharger in accordance with movements of a control element in response to variations in the pressure drop across said throttle, and means for moving said control element at a velocity proportional to the deviation of said pressure drop from a selected value.

16. Apparatus according to claim 15 including a boost control responsive to the engine combustion chamber intake pressure, or the delivery pressure downstream of the compressor, for automatically controlling said throttle.

17. In an engine having an induction system, a supercharger and a throttle in said induction system, means including a hydraulic coupling for driving said supercharger, and means responsive to the pressure drop across said throttle for controlling the speed of said supercharger through said hydraulic coupling including a housing, a pilot valve, a diaphragm operably connected to said pilot valve, a conduit for connecting one side of said diaphragm to said induction passage upstream of said throttle valve, another conduit for connecting the other side of said diaphragm to said induction passage downstream of said throttle valve, a sleeve valve, said pilot valve slidably positioned in said sleeve valve to control the flow of a fluid to said hydraulic coupling.

18. In an engine having a main stage supercharger and an auxiliary stage supercharger whose outlet is connected to the inlet of the main stage supercharger by a fluid passage, a variable restricting device in said fluid passage, means responsive to the engine combustion chamber intake pressure for regulating said intake pressure by varying the restricting device, and means for varying the outlet pressure of said auxiliary stage supercharger in accordance with variations in the pressure drop across said restricting device from a selected value.

19. Apparatus according to claim 1, including a boost control responsive to the engine combustion chamber intake pressure, or the delivery pressure downstream of the compressor, for automatically controlling said throttle.

20. Apparatus according to claim 1, including a boost control responsive to the pressure downstream of the throttle for automatically controlling said throttle.

21. In an engine having a supercharger and a throttle, a variable slip fluid coupling for driving said supercharger at a variable speed relative to said engine, means for varying the speed ratio of said coupling with changes in the position of a control element, means for relatively quickly changing the position of said control element by amounts proportional to deviations from a predetermined value of pressure drop across the throttle, resetting means for relatively slowly adjusting said control element until said pressure drop is returned approximately to said predetermined value.

22. Apparatus according to claim 21 including a boost control responsive to a pressure downstream of said throttle for automatically controlling said throttle.

23. In an engine having an induction system and a combustion chamber, a throttle in said induction system, means responsive to the engine combustion chamber intake pressure for regulating said intake pressure by varying said throttle, a supercharger in said induction system between the throttle and combustion chamber intake, and means connected across said throttle for varying the speed of said supercharger in accordance with variations in the pressure drop across said throttle from a selected value.

24. In an engine having an induction system and a combustion chamber, a main stage supercharger and an auxiliary stage supercharger in said induction system, a variable restricting device in said induction system, means responsive to the engine combustion chamber intake pressure for regulating said intake pressure by varying the restricting device, and means connected across said restricting device for varying the speed of said auxiliary stage supercharger in accordance with variations in the pressure drop across said restricting device from a selected value.

RICHARD J. COAR.

References Cited in the file of this patent

UNITED STATES PATENTS

| Number | Name | Date |
|---|---|---|
| 991,641 | Plantinga | May 9, 1911 |
| 1,390,829 | Smoot | Sept. 13, 1921 |
| 2,240,515 | Partington | May 6, 1941 |
| 2,267,437 | Alfaro | Dec. 23, 1941 |
| 2,393,172 | Larrecq | Jan. 15, 1946 |
| 2,400,306 | Hobbs | May 14, 1946 |
| 2,400,830 | Kinnucan et al. | May 21, 1946 |
| 2,422,162 | Borell | June 10, 1947 |
| 2,491,482 | Dolza et al. | Dec. 20, 1949 |
| 2,575,345 | Jorgensen et al. | Nov. 20, 1951 |

FOREIGN PATENTS

| Number | Country | Date |
|---|---|---|
| 205,291 | Switzerland | Sept. 1, 1939 |
| 125,004 | Australia | June 26, 1946 |